Aug. 28, 1923.

O. B. WHITAKER

WIND VELOCITY AND GROUND SPEED INDICATOR

Filed May 17, 1918

INVENTOR
OMAR B. WHITAKER
BY
Herbert H. Thompson
his ATTORNEY

Aug. 28, 1923.
O. B. WHITAKER
WIND VELOCITY AND GROUND SPEED INDICATOR
Filed May 17, 1918   2 Sheets-Sheet 2
1,466,416
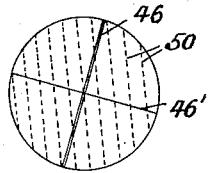
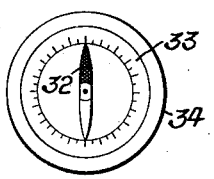
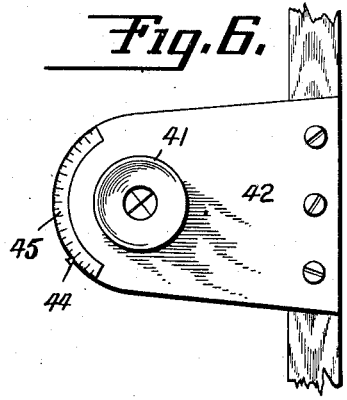
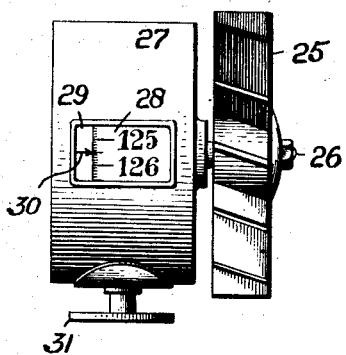
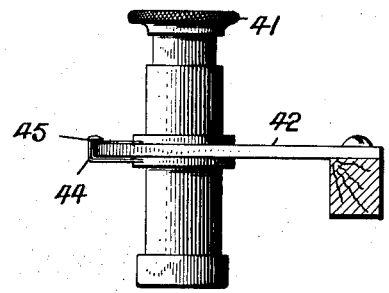
INVENTOR
OMAR B. WHITAKER
BY
Herbert H. Thompson
his ATTORNEY Patented Aug. 28, 1923.

1,466,416

UNITED STATES PATENT OFFICE.

OMAR B. WHITAKER, OF BROOKLYN, NEW YORK, ASSIGNOR TO THE SPERRY GYROSCOPE COMPANY, OF BROOKLYN, NEW YORK, A CORPORATION OF NEW YORK.

WIND VELOCITY AND GROUND SPEED INDICATOR.

Application filed May 17, 1918. Serial No. 235,092.

*To all whom it may concern:*

Be it known that I, OMAR B. WHITAKER, a citizen of the United States of America, residing at 129 McDonough Street, Brooklyn, in the county of Kings and State of New York, have invented certain new and useful Improvements in Wind Velocity and Ground Speed Indicators, of which the following is a specification.

This invention relates to methods and means for determining the ground speed, velocity of the wind and other useful information on a moving aircraft.

Heretofore, it has been the practice to determine the ground speed of an aircraft by taking certain readings, including the determination of the altitude of the aircraft, and to compute, mechanically or otherwise, the ground speed from these readings. As it is practically impossible to determine the altitude accurately the ground speed computed by this method is necessarily inaccurate and unreliable.

One of the principal objects of this invention is to provide a means and method of determining the ground speed without employing any altitude reading.

Another object is to determine, on a moving aircraft, the actual velocity of the wind.

Further important objects are to determine the angle through which the aircraft should be turned to cause it to assume a true course identical with the present apparent course and to indicate or predict the ground speed on the new true course. Other objects and advantages will appear as the invention is hereinafter developed.

Referring to the accompanying drawings which illustrate what I now consider the preferred form of my invention, Fig. 1 is a plan view of one form of mechanism for determining the quantities mentioned above.

Fig. 4 is a plan view of one form of compass which may be employed.

Fig. 5 is an elevation of an air speed indicator employed in connection with my invention.

Figs. 6 and 7 are respectively a plan and elevation of a drift indicator.

Fig. 8 is a diagrammatic representation of the image seen through the device shown in Figs. 6 and 7.

I propose to determine the ground speed of the aircraft by taking readings of air speed and drift, changing one of these quantities, taking a new reading, or readings, and obtaining the ground speed from these readings. My invention may best be understood by reference to the diagram shown in Fig. 9.

Referring to this figure, suppose the line $b\ d$ represents the longitudinal axis of the aircraft, i. e. the apparent heading, $o\ c$ the actual velocity of the wind, and $o\ b$ the air speed of the aircraft. By wind velocity I mean not only the speed of the wind but the direction thereof with respect to the longitudinal axis $b\ d$ and by air speed I mean the relative speed of the air craft and wind along the line $b\ d$. The line $b.\ c$ will be the ground speed of the aircraft and the angle D the drift, i. e. the angle between the true and apparent headings. Although the drift D and air speed $o\ b$ are readily obtainable, as will hereinafter appear, these two quantities do not determine the triangle $o\ c\ b$. This may be done however by varying one or both of said quantities and taking new readings. Thus suppose that the apparent heading is maintained, which means that vector $o\ c$ will remain the same, but the air speed is changed to $a\ o$. $a\ c$ will represent the new ground speed and angle D' the drift. Knowing the air speeds $o\ b$ and $o\ a$ and the corresponding drifts D and D' the ground speed $b\ c$ and velocity of the wind $o\ c$ are readily obtainable.

Figure 1:
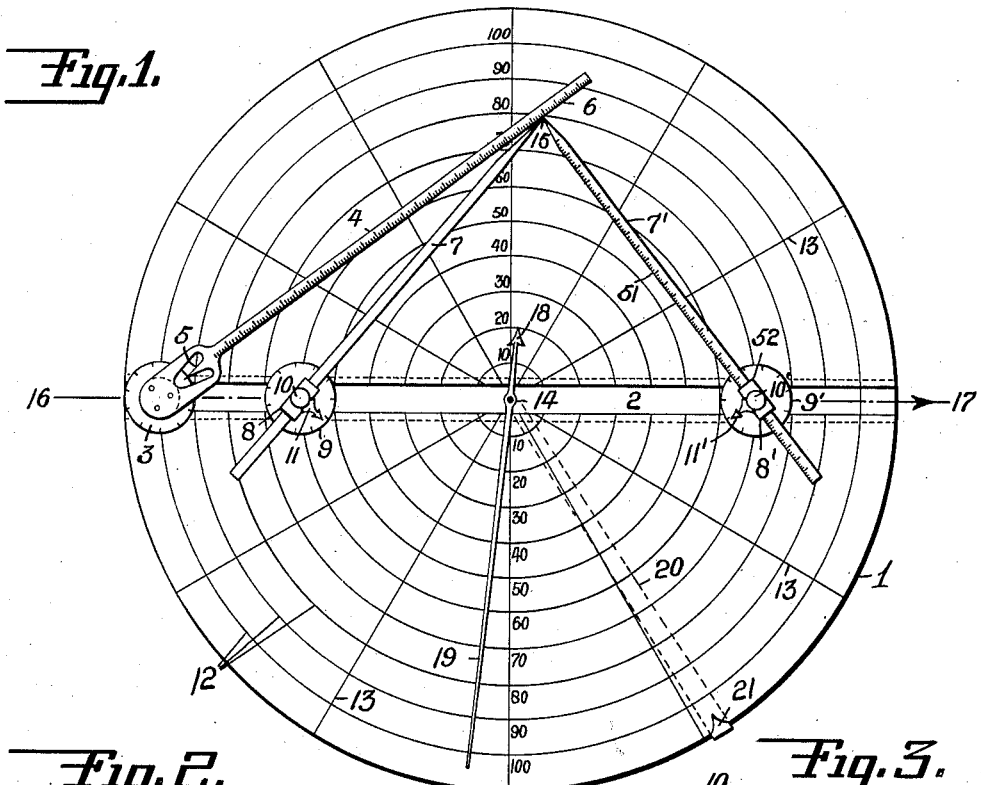

While various forms of mechanism may be employed for obtaining the ground speed and air speed, as outlined above, I prefer to employ apparatus of the type illustrated in Figs. 1 to 3 which may be constructed substantially as follows: A plate 1, which may be mounted on the aeroplane or other aircraft in any suitable manner, is provided with a slot 2 in which a head 3 is slidably mounted. An arm 4 is rotatably mounted on said head 3 and is shown provided with a pointer 5 adapted to be read on an angular scale shown on said head to indicate the angle between the arm and the center line of the slot 2. The arm 4 is shown provided with a scale 6 having its zero point at the pivot of said arm. An additional arm 7 is provided, which may be identically the same as arm 4. I have shown this arm, however, provided with a point at its free end and slidably mounted in a block 8 pivotally mounted on a head 9 slidably mounted in the slot 2 as shown in Figs. 1 and 3. A screw 10 may be provided in block 8 for holding the arm 7 in adjusted position. In order to indicate the angle between the arm 7 and the central line of the slot 2 I provide the head 9 with a scale with which a pointer 11 is adapted to cooperate.

The plate 1, which may assume the form of a disc as shown, may be provided with a plurality of concentric circles 12 which provide a scale for indicating distance from the center of said disc, said scale being calibrated to the same, scale as arm 4. Said disc 1 may also be provided with equiangularly spaced radial lines 13 for a purpose which will hereinafter appear.

The operation of my invention as thus far described may be substantially as follows: Supposing that the air craft is in flight and it is desired to determine the ground speed; the air speed and drift should be first determined. Instruments for determining the air speed and drift will be hereinafter described. The head 3 is then slid in slot 2 until the distance between its center and the center of disc 1, as indicated by circles 12, is equal to the air speed. The arm 4 is then shifted to indicate the corresponding drift at 5. The air craft may now be slowed down, by throttling or in any other suitable manner, care being taken to keep it on the same apparent course. The head 9 is now set a distance from the center of disc 1 equal to the new air speed and the arm 7 shifted to cause the pointer 11 to indicate the new drift. The arm 7 may now be shifted in block 8 until the point of said arm lies on the edge of the scale 6 on arm 4. The reading of said point on the last mentioned scale is the ground speed desired. Obviously the machine may be brought back to normal speed when the readings of the slower air speed and corresponding drift have been taken.

Figure 9:
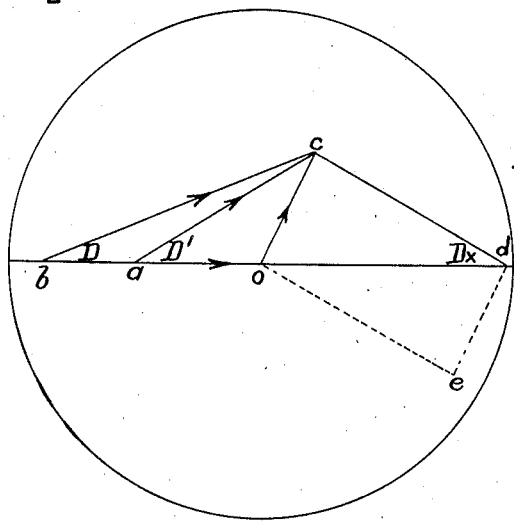
Fig. 9 is a diagram employed in explaining my invention.

It will be noted that the distance between the centers of head 3 and disc 1 corresponds to $b$, $o$ in Fig. 9; the distance between the centers of head 9 and disc 1 to $a$, $o$; the angle indicated at 5 to D; the angle indicated at 11 to D' and the point of arm 7 to the point of intersection $c$. The points in Fig. 1 corresponding to points $o$ and $c$ of Fig. 9 are designated 14 and 15 respectively and obviously the distance 14—15 which may be read by virtue of circles 12, is the actual speed of the wind.

If the disc 1 is so mounted on the aircraft that the center line 16, 17 of the slot 2 is coincident with or parallel to the longitudinal axis of said aircraft the line 14, 15 will not only represent the actual speed of the wind but the actual velocity thereof, i. e. the speed and direction. As the apparent heading of the aircraft is determinable, the direction of the wind with respect to the earth is readily obtainable. For facilitating the last mentioned determination a double pointer 18, 19 may be pivoted at 14 and an arm 20 may be pivoted at the same point but below the disc 1. Said arm 20 is shown provided with a bent up portion 21 in the form of a pointer overlying the upper side of disc 1. By setting the pointer 21 to point to the south and setting the pointer 18 along line 14, 15, the angle between the pointers 21 and 19, which may be read by virtue of the radial lines 13, will be the angle that the wind makes with the true north. With the particular setting shown in Fig. 1 the wind is blowing from a direction 39° east of north at a speed of 80 kilometers per hour.

In describing the operation in determining the ground speed, set forth above, it was stated that the arm 4 should be positioned in accordance with the drift. If there is no drift this means either (1) that there is no wind, (2) that there is a tail wind or (3) that there is a head wind. The procedure to determine the ground speed may then be as follows: The course of the aircraft is changed, say 30°. If there is no drift at this time, obviously there is no wind and the ground speed is equal to the air speed. If there is a drift the velocity of the wind may be obtained as set forth above and arithmetically added to or subtracted from the air speed, depending on whether the wind is a tail or head wind, when the aircraft is returned to its original or no drift heading.

As has been previously stated it is desirable to determine air speed, apparent heading and drift of the aeroplane in order to set the parts shown in Fig. 1. These quantities may be obtained in any suitable manner, as for example, by means of the instruments illustrated in Figs. 4 to 8.

For obtaining the air speed an instrument of the type illustrated in Fig. 5 may be employed. This instrument is shown as comprising a device 27 for giving an indication at 28, 30 through the window 29, in accordance with the speed of rotation of the shaft 26. Mounted on shaft 26 for rotating the same is a wind-wheel 25. The pitch of this wheel and the calibration of the drum 28 are preferably such that an indication in air speed in miles per hour is given. The instrument may be provided with a pedestal or base 31 for securing it to the aircraft, in such position that the shaft 26 will be parallel to the longitudinal axis of the aircraft and the wheel 25 in front of member 27.

A magnetic compass 34 comprising a magnetic needle 32 and a lubber ring or scale 33 may be employed for obtaining the apparent heading of the aircraft. Preferably the compass should be so secured to the aircraft that the line through the zero point of the scale 33 and the center of the needle 32 is parallel to the longitudinal axis of the aircraft with said zero point forward.

For determining the angle of drift an instrument of the type illustrated in Figs. 6, 7 and 8 may be employed. This instrument comprises an object focusing or image producing device such as a telescope 41, rotatably mounted about its vertical axis in a bracket 42. A pointer 44 is secured to the sighting tube 41 so as to be readable upon a scale 45 on bracket 42 whereby the angle through which the sighting tube is operated is indicated to the observer. Cross hairs 46, 46' are provided within the tube 1, one of which, 46, is double and so arranged that when it is parallel to the longitudinal axis of the aircraft the reading of the pointer 44 on scale 45 is zero. If it is desired to obtain the drift the observer looks at the earth through the sighting device and turns the latter until the hairs 46 are parallel to the stream lines 50 of objects on the earth. The pointer 44 will then indicate the angle of drift on the scale 45.

I wish to emphasize that my invention is independent of the specific method of and apparatus employed in determining air speed, apparent heading and drift, so that instruments or methods other than those disclosed may be employed.

Figure 2:
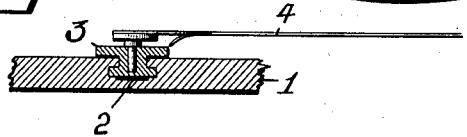
Figs. 2 and 3 are fragmentary detail elevations of certain of the parts illustrated in Fig. 1.
Figure 3:
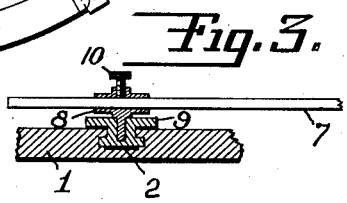

The apparatus illustrated in Figs. 1 to 3 may be operated and employed in another way. Thus suppose the wind velocity has been determined as above set forth and is therefore known. Suppose further that the course is changed. Obviously the ground speed will change although the wind velocity remains the same. The new ground speed may now be obtained in any one of several ways without changing the air speed. First, the arm 4 may be set to the corresponding air speed and drift as previously set forth and as the direction of the wind is known the arm 19 may be set so that the arrow 18 points in the direction from which the wind is blowing. It is assumed of course that the line 16—17 is parallel to the longitudinal axis of the aircraft. The intersection of arm 19 on scale 6 will give the ground speed desired.

A second method is to set the arm 4, as in the last disclosed method and then to find the point of intersection of the edge of scale 6 and the circle 12 corresponding to actual speed of the wind. Thus suppose the latter is 80 kilos per hour. The intersection of scale 6 and the 80 kilometer circle 12 is read on scale 6, which gives the ground speed.

Third method of obtaining the ground speed when the wind velocity is known, without changing the air speed or even noting the drift is as follows: As the line 16—17 is parallel to the longitudinal axis of the aircraft and the wind velocity (i. e. actual speed and direction of the wind) is known the point $c$ of Fig. 9 or 15 of Fig. 1 is located on dial or disc 1. This point may be conveniently marked by setting the end of arm 7 on said point. The head 3 may then be set to the air speed and the arm 4 swung until the point of arm 7 lies on the edge of the scale 6. The reading of said point on said scale is the ground speed desired.

The apparatus illustrated may be employed also to predict what the ground speed will be when the aircraft is turned to put it on a true course which is the same as the apparent course before the turn is made and to indicate or determine the angle through which the machine should be turned to so change the course. Referring again to Fig. 9 suppose that the apparent heading of the aircraft is in the direction $b\ o$, the air speed is $o\ b$, and the velocity of the wind is $o\ c$. If an arc is struck on $o\ d$ with $c$ as a center and the length $o\ b$ (air speed) as a radius a point $d$ is determined and the angle $D^x$ will be the angle desired and $o\ d$ the ground speed desired. This may be proved as follows:

Draw line $o\ e$ through $o$ and parallel to $c\ d$, and $d\ e$ through $d$ and parallel to $o\ c$; $o\ e$ will then be the air speed vector, when flying in the apparent direction, $o\ e$, and $e\ d$, the wind velocity vector. The length of $o\ d$ will therefore be the ground speed on an actual course $o\ d$ and the angle $e\ o\ d$ will be the angle of drift when the apparent heading is $o\ e$. This angle, which is equal to the angle $D^x$ is the angle through which the aircraft must be turned to cause the machine to assume a true course which is the same as the apparent course of the machine before the turn is made.

In order to determine this ground speed and angle the instrument may be provided with an arm 7' mounted in slot 2 and having elements 8', 9', 10' and 11' corresponding to arm 7 and elements 8, 9, 10 and 11 already described. The arm 7' is shown provided with calibrations 51 to the same scale as those on scale 4. These calibrations are adapted to be read in conjunction with the edge 52 of block 8' to indicate distance between the point of arm 7' at which the zero point is located and the center of head 9'.

If the machine is traveling in the direction 16—17 and the wind velocity has been determined, i. e. the point 15, which corresponds to c in Fig. 9, is located the following procedure may be adopted to obtain the angle D$^x$, above mentioned, and the ground speed along a true course which is the same as the apparent course 16—17. The point of arm 7' may be placed and held at 15 and the head 9' shifted until the reading of scale 51 is equal to the air speed. The reading of the pointer 11' on the angle scale of head 9' is the angle desired and the distance of the center of head 9' from the point 14, read by means of circles 12 is the ground speed desired.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. Apparatus for determining the velocity of the wind on an aircraft, comprising a base member provided with graduations for indicating wind velocity, a rectilinear slideway therein and means comprising a plurality of rotatable members rectilinearly movable in said slideway, and adapted to be set in accordance with the air speed and drift of the aircraft for cooperating with said graduations to indicate the wind velocity.

2. In combination, a base member provided with graduations indicating wind velocity, a rectilinear slideway therein, a rotatable element movable in said slideway and adapted to be set in accordance with the air speed and drift of an aircraft, and provided with graduations indicating ground speed, means comprising a second rotatable element also movable in said slideway and adapted to be set in accordance with another air speed and drift for cooperating with the graduations on the first mentioned element to indicate ground speed of the craft and for cooperating with the graduations on the base member to indicate wind velocity, and means on said base member adapted to be set along a line passing through the point at which the second mentioned element cooperates with the first mentioned element to indicate the direction of the wind.

3. Apparatus for determining the velocity of the wind on an aircraft, comprising a base member provided with graduations for indicating wind velocity, a rectilinear slideway therein, means comprising a plurality of rotatable members rectilinearly movable in said slideway and adapted to be set in accordance with the air speed and drift of the aircraft for cooperating with said graduations to indicate the wind velocity and rotatable means cooperating therewith for indicating the direction of the wind.

4. A calculating instrument for aircraft comprising a base having circular and angular graduations, a slideway therein, a plurality of graduated discs slidably mounted therein, and a rotatably mounted arm on each disc, at least one of which is graduated.

5. A calculating instrument for aircraft comprising a base having circular and angular graduations, a slideway therein, three graduated discs slidably mounted therein, and a rotatably mounted arm on each disc, at least two of which are graduated.

6. A calculating instrument for aircraft comprising a base having circular and angular graduations, a slideway therein, a plurality of graduated discs slidably mounted therein, a rotatably mounted arm on each disc, at least one of which is graduated, and a rotatable pointer pivoted at the center of said base.

7. A calculating instrument for aircraft comprising a base having circular and angular graduations, a slideway therein, three graduated discs slidably mounted therein, a rotatably mounted arm on each disc, at least two of which are graduated, and a pair of rotatable pointers pivoted at the center of said base.

In testimony whereof I have affixed my signature.

OMAR B. WHITAKER.